United States Patent
Day et al.

(10) Patent No.: US 8,826,121 B2
(45) Date of Patent: *Sep. 2, 2014

(54) MAGNIFYING THE TEXT OF A LINK WHILE STILL RETAINING BROWSER FUNCTION IN THE MAGNIFIED DISPLAY

(75) Inventors: Don R. Day, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/360,297

(22) Filed: Jan. 27, 2012

(65) Prior Publication Data

US 2012/0131429 A1 May 24, 2012

Related U.S. Application Data

(60) Division of application No. 12/181,120, filed on Jul. 28, 2008, now Pat. No. 8,112,705, which is a continuation of application No. 09/820,511, filed on Mar. 29, 2001, now Pat. No. 7,437,670.

(51) Int. Cl.
G06F 17/22 (2006.01)
G09G 5/00 (2006.01)

(52) U.S. Cl.
USPC ........... 715/234; 715/273; 715/770; 715/796; 345/660; 345/698

(58) Field of Classification Search
USPC ........... 715/234, 273, 770, 796; 345/660, 698
See application file for complete search history.

(56) References Cited

U.S. PATENT DOCUMENTS

| 4,428,065 A | 1/1984 | Duvall et al. |
| 4,751,507 A | 6/1988 | Hama et al. |
| 5,586,196 A | 12/1996 | Sussman |
| 5,638,523 A | 6/1997 | Mullet et al. |
| 5,721,851 A | 2/1998 | Cline et al. |
| 5,754,348 A | 5/1998 | Soohoo |
| 5,793,964 A | 8/1998 | Rogers et al. |
| 5,802,530 A | 9/1998 | Van Hoff |
| 5,898,423 A | 4/1999 | Tognazzini et al. |

(Continued)

FOREIGN PATENT DOCUMENTS

| JP | 58100889 A | 6/1983 |
| JP | 07093574 A | 4/1995 |

(Continued)

OTHER PUBLICATIONS

Durham, "Web Sites for the Language-Impaired," IEEE Transaction on Professional Communication, 42(3):175-177, Sep. 1999.

(Continued)

Primary Examiner — Maikhanh Nguyen
(74) Attorney, Agent, or Firm — Yee & Associates, P.C.; Steven L. Bennett (57) ABSTRACT

A web browser magnifies the content of the whole page in memory and displays the relevant portion in a magnifier with hyperlinks. The web browser then maps the magnified display to the original document. Thus, manipulation of the mouse in the magnified display may result in an action with respect to the original document. The user may then select a link for navigation within the magnified display. Alternatively, the web browser may analyze the original web page and construct magnifier contents on the basis of either the document object model, extensible markup language (XML), or hypertext markup language (HTML) representation of the magnified portion.

6 Claims, 10 Drawing Sheets

(56) References Cited

U.S. PATENT DOCUMENTS

| | | | |
|---|---|---|---|
| 5,920,327 A | 7/1999 | Seidensticker, Jr. | |
| 6,044,385 A | 3/2000 | Gross et al. | |
| 6,121,970 A | 9/2000 | Guedalia | |
| 6,266,042 B1 | 7/2001 | Aratani | |
| 6,275,829 B1 | 8/2001 | Angiulo et al. | |
| 6,388,679 B1 | 5/2002 | Kluck et al. | |
| 6,700,589 B1 | 3/2004 | Canelones et al. | |
| 6,704,034 B1 | 3/2004 | Rodriguez et al. | |
| 6,826,726 B2 | 11/2004 | Hsing et al. | |
| 6,829,746 B1 | 12/2004 | Schwerdtfeger et al. | |
| 6,941,509 B2 | 9/2005 | Harris | |
| 7,054,952 B1 | 5/2006 | Schwerdtfeger et al. | |
| 7,073,128 B2 | 7/2006 | Lloyd-Jones et al. | |
| 7,085,999 B2 | 8/2006 | Maeda et al. | |
| 7,437,670 B2 | 10/2008 | Day et al. | |
| 7,895,583 B2 | 2/2011 | Szepesvary et al. | |
| 8,112,705 B2 | 2/2012 | Day et al. | |
| 2001/0054049 A1 | 12/2001 | Maeda et al. | |
| 2002/0143826 A1 | 10/2002 | Day et al. | |
| 2003/0164848 A1 | 9/2003 | Dutta et al. | |
| 2003/0192026 A1 | 10/2003 | Szepesvary et al. | |
| 2008/0282157 A1 | 11/2008 | Day et al. | |

FOREIGN PATENT DOCUMENTS

| | | | |
|---|---|---|---|
| JP | 10133639 A | 5/1998 | |
| JP | 63273079 A | 11/1998 | |
| JP | 10334082 A | 12/1998 | |
| JP | 2000187544 A | 7/2000 | |

OTHER PUBLICATIONS

Manola, "Towards a Richer Web Object Model," ACM SIGMOD Record, 27(1):76-80, Mar. 1998.

Moehling et al., "Considering Accessibility for Visually Impair Users," 1999 IEEE International Professional Communication Conference, IPCC '99, Communication Jazz: Improvising the New International Communication Culture, New Orleans, Louisiana, Sep. 1999, pp. 335-344.

Wood, "Programming the Web: The W3C DOM Specification," IEEE Internet Computing, Jan.-Feb. 1999, pp. 48-54.

Zajicek et al., "Enabling Visually Impaired People to Use the Internet", IEE Colloquium on Computers in the Service of Mankind: Helping the Disabled, Digest No. 117:11/1-11-3, Mar. 1997.

Japanese Office Action, dated Oct. 13, 2006, regarding Japanese Application No. 10-334082, 1 pages.

Japanese Office Action, dated Dec. 10, 2009, 1 pages.

Office Action, dated Jul. 28, 2004, regarding U.S. Appl. No. 09/820,511, 10 pages.

Response to Office Action, dated Oct. 26, 2004, regarding U.S. Appl. No. 09/820,511, 19 pages.

Office Action, dated Feb. 24, 2005, regarding U.S. Appl. No. 09/820,511, 13 pages.

Response to Office Action, dated Apr. 27, 2005, regarding U.S. Appl. No. 09/820,511, 26 pages.

Office Action, dated Jul. 12, 2005, regarding U.S. Appl. No. 09/820,511, 15 pages.

Response to Office Action, dated Oct. 11, 2005, regarding U.S. Appl. No. 09/820,511, 30 pages.

Final Office Action, dated Jan. 3, 2006, regarding U.S. Appl. No. 09/820,511, 15 pages.

Appeal Brief, dated May 26, 2006, regarding U.S. Appl. No. 09/820,511, 48 pages.

Office Action, dated Aug. 7, 2006, regarding U.S. Appl. No. 09/820,511, 16 pages.

Response to Office Action, dated Nov. 7, 2006, regarding U.S. Appl. No. 09/820,511, 24 pages.

Final Office Action, dated Jan. 24, 2007, regarding U.S. Appl. No. 09/820,511, 17 pages.

Appeal Brief, dated May 11, 2007, regarding U.S. Appl. No. 09/820,511, 38 pages.

Response to Notice of Non-Compliant Amendment, dated Sep. 20, 2007, regarding U.S. Appl. No. 09/820,511, 47 pages.

Office Action, dated Dec. 31, 2007, regarding U.S. Appl. No. 09/820,511, 14 pages.

Response to Office Action, dated Mar. 31, 2008, regarding U.S. Appl. No. 09/820,511, 17 pages.

Notice of Allowance, dated Jun. 3, 2008, regarding U.S. Appl. No. 09/820,511, 18 pages.

Office Action, dated Jan. 25, 2011, regarding U.S. Appl. No. 12/181,120, 16 pages.

Response to Office Action, dated Apr. 25, 2011, regarding U.S. Appl. No. 12/181,120, 16 pages.

Final Office Action, dated Jul. 6, 2011, regarding U.S. Appl. No. 12/181,120, 6 pages.

Response to Final Office Action, dated Sep. 22, 2011, regarding U.S. Appl. No. 12/181,120, 8 pages.

Notice of Allowance, dated Oct. 4, 2011, regarding U.S. Appl. No. 12/181,120, 9 pages.

Figure 10 though, as well as a preferred mode of use, further objectives# MAGNIFYING THE TEXT OF A LINK WHILE STILL RETAINING BROWSER FUNCTION IN THE MAGNIFIED DISPLAY This application is a divisional of application Ser. No. 12/181,120, filed Jul. 28, 2008, status allowed, which is a continuation of U.S. patent application Ser. No. 09/820,511 filed Mar. 29, 2001, now US Pat. No. 7,437,670 issued Oct. 14, 2008.

BACKGROUND OF THE INVENTION

1. Technical Field

The present invention relates to an improved data processing system and, in particular, to a method and apparatus for managing world wide web documents in a data processing system. Still more particularly, the present invention provides a method, apparatus, and program for magnifying the text of a link while retaining browser functionality in the magnified display.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." These web pages are versatile and customized by authors. For example, web pages may mix text and graphic images. A web page also may include fonts of varying sizes.

A browser is a program that is executed on a graphical user interface (GUI). The browser allows a user to seamlessly load documents from the Internet and display them by means of the GUI. These documents are commonly formatted using markup language protocols, such as hypertext markup language (HTML). Portions of text and images within a document are delimited by indicators, which affect the format for display. In HTML documents, the indicators are referred to as tags. Tags may include links, also referred to as "hyperlinks," to other pages. The browser gives some means of viewing the contents of web pages (or nodes) and of navigating from one web page to another in response to selection of the links.

The versatility and customization of web pages, however, are sometimes an impediment to users. Some web pages may be designed with small fonts to accommodate more content. For example, a "portal" may be designed to provide access to information and services, such as news, shopping, and stock quotes, from a wide variety of sources. This results in a very "busy" page with small fonts and many links to navigate.

Visually impaired users may find it difficult to locate links in documents with small print. Other users may have difficulty with fine motor movements and cannot manipulate a mouse pointer with accuracy, thus making it difficult to select links in a crowded portion of the page. Magnifiers exist that allow a user to select a portion of a web page and generate a magnified display of that portion. However, after a link is located in the magnified display, the user must return to the browser to locate and select the link. Therefore, a user with visual impairment or difficulty with fine motor movements still faces the problem of locating and selecting the link in the original display.

Thus, it would be advantageous to provide a magnified display while retaining the functionality of the web browser.

SUMMARY OF THE INVENTION

The present invention provides a web browser that magnifies the content of the whole page in memory and displays the relevant portion in a magnifier with hyperlinks. The web browser then maps the magnified display to the original document. Thus, manipulation of the mouse in the magnified display may result in an action with respect to the original document. For example, the user may select a portion of text to be copied and pasted into another application. The user may also select a link for navigation within the magnified display. Alternatively, the web browser may analyze the original web page and construct magnifier contents on the basis of either the document object model, extensible markup language (XML), or hypertext markup language (HTML) representation of the magnified portion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
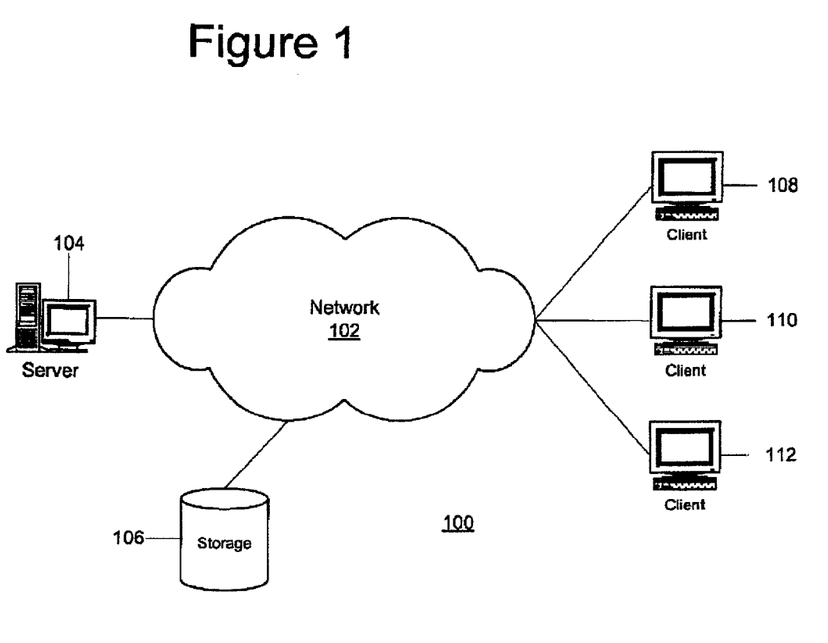
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
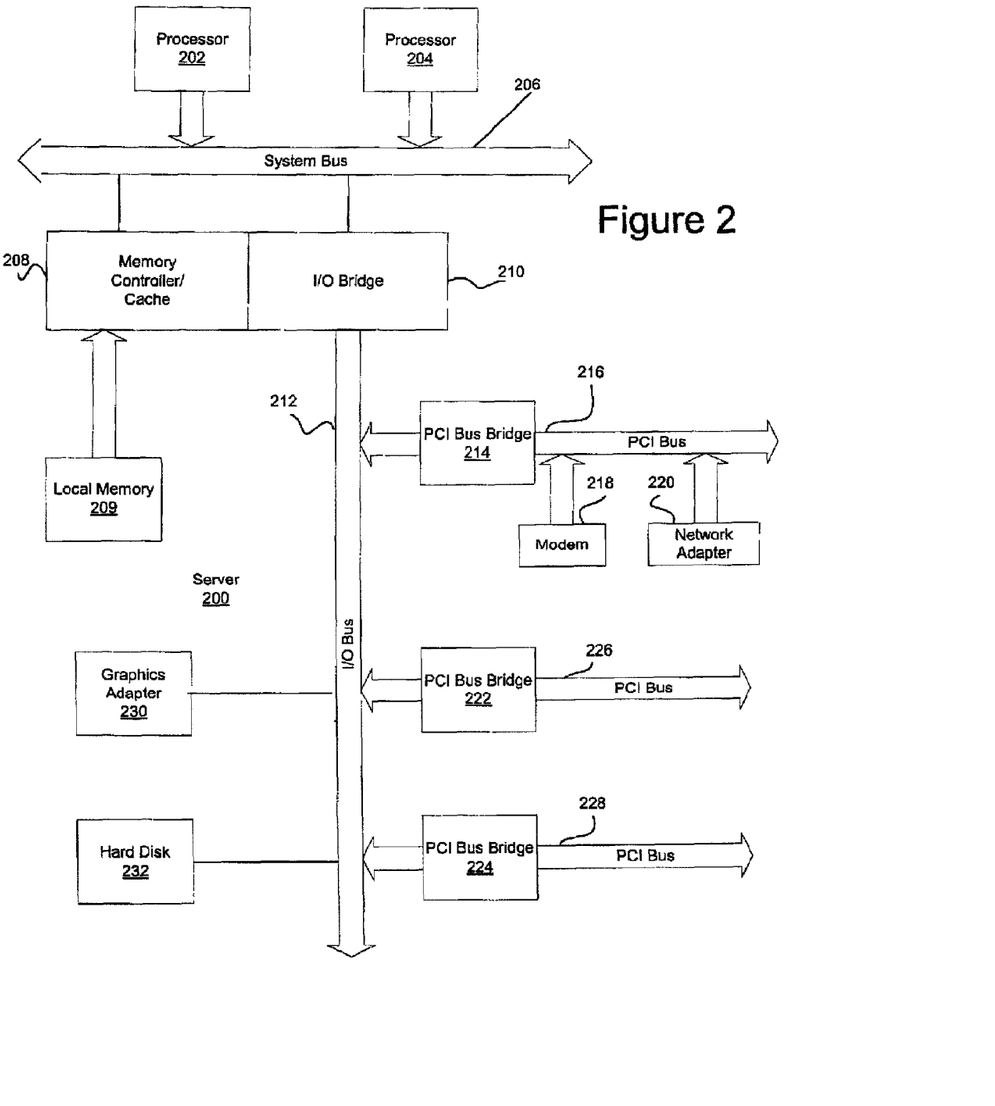
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
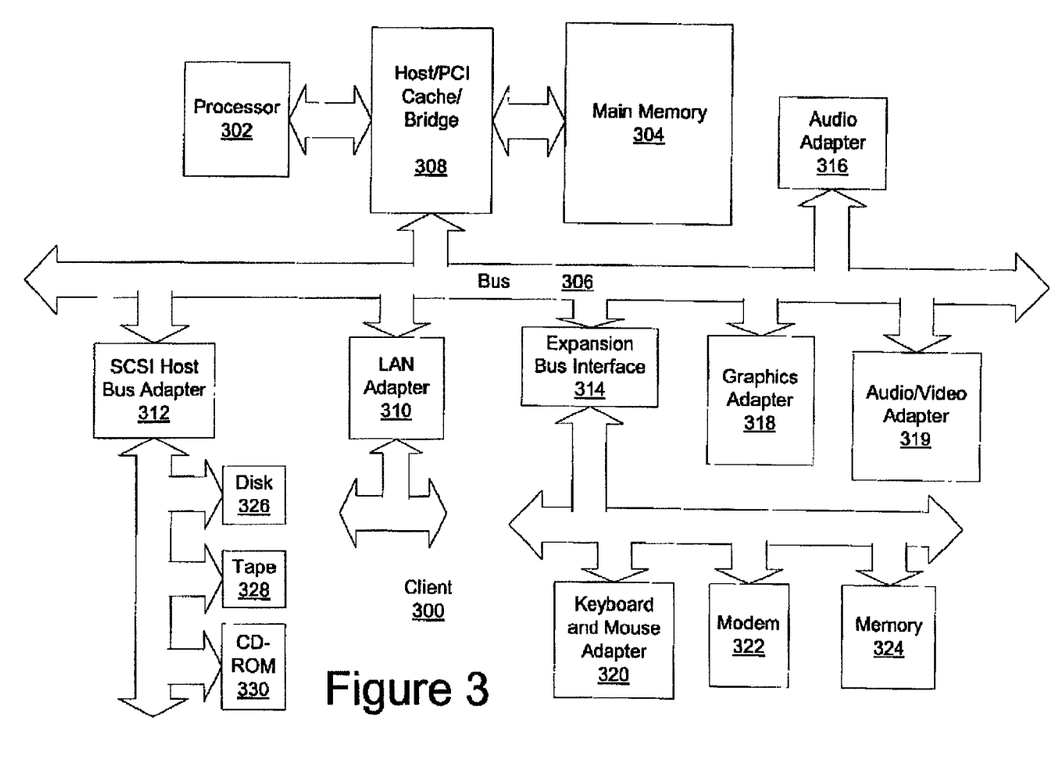
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In accordance with a preferred embodiment of the present invention a web browser running on a client, such as clients 108, 110, 112 in FIG. 1 magnifies the content of the whole page in memory and displays the relevant portion in a magnifier with hyperlinks. The web browser then maps the magnified display to the display space of the original document. Thus, manipulation of the mouse in the magnified display may result in an action with respect to the original document.

For example, the user may select a portion of text to be copied and pasted into another application. The user may also select a link for navigation within the magnified display. Alternatively, the web browser may analyze the original web page and construct magnifier contents on the basis of either the document object model, extensible markup language (XML), or hypertext markup language (HTML) representation of the magnified portion.

Figure 4:
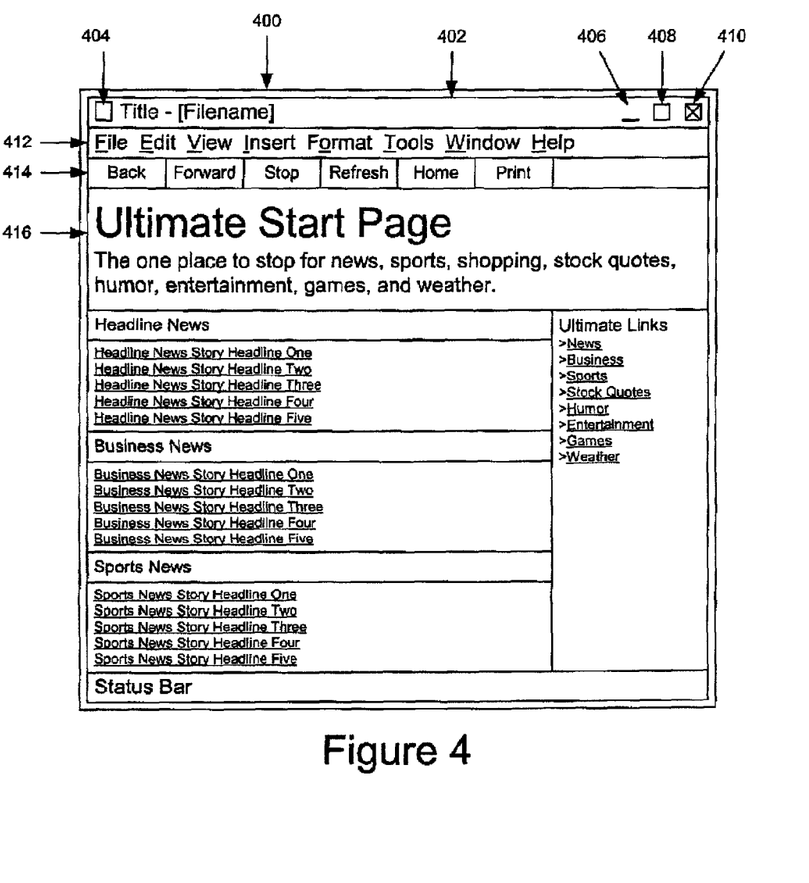
FIG. 4 is an example of a screen of display of a browser window in accordance with a preferred embodiment of the present invention.

An example of a screen of display of a browser window is shown in FIG. 4 in accordance with a preferred embodiment of the present invention. The screen comprises window 400, including a title bar 402, which may display the name of the application program. Title bar 402 also includes a control box 404, which produces a drop-down menu (not shown) when selected with the mouse, and "minimize" 406, "maximize" or "restore" 408, and "close" 410 buttons. The "minimize" and "maximize" or "restore" buttons 406 and 408 determine the manner in which the program window is displayed. In this example, the "close" button 410 produces an "exit" command when selected. The drop-down menu produced by selecting control box 404 includes commands corresponding to "minimize," "maximize" or "restore," and "close" buttons, as well as "move" and "resize" commands.

Browser window 400 also includes a menu bar 412. Menus to be selected from menu bar 412 may include "File," "Edit," "View," "Insert," "Format," "Tools," "Window," and "Help." However, menu bar 412 may include fewer or more menus, as understood by a person of ordinary skill in the art. The browser window also includes toolbar 414 with buttons used to navigate web pages. The buttons may include, but are not limited to, "Back," "Forward," "Stop," "Refresh," "Home," and "Print."

The browser window includes a display area 416 in which the contents of a document are displayed. The document may be retrieved from a server, such as server 104 in FIG. 1. The document may also be retrieved from another location, such as a hard disk in the client computer. As seen in FIG. 4, a web page may contain many links displayed in a small font. Typically, links are displayed with underlining; however, other mechanisms may be used to differentiate hyperlinks within a document. For example, links may be displayed in a preselected color or the mouse cursor may change when moved over a hyperlink. Clusters of small links may present problems for users with visual impairment or difficulty with fine motor movements.

Figure 5:
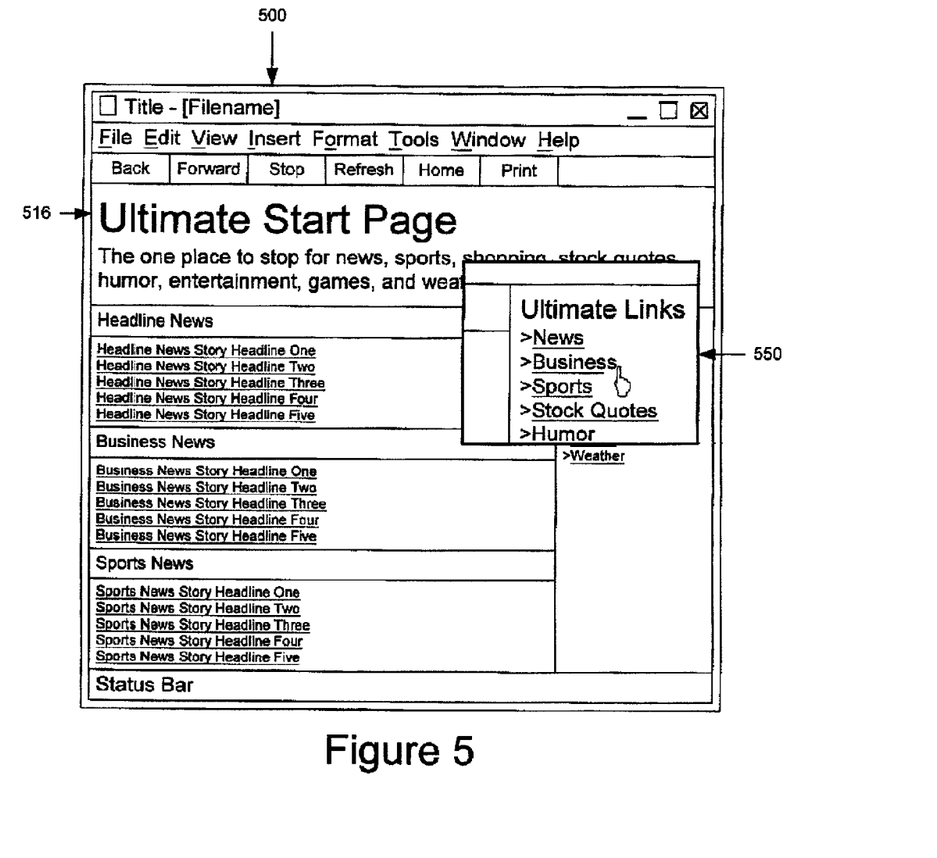
FIG. 5 is an example screen of display of a browser window with a magnifier in accordance with a preferred embodiment of the present invention.

With reference now to FIG. 5, an example screen of display of a browser window with a magnifier is shown in accordance with a preferred embodiment of the present invention. The screen comprises window 500, including display area 516. The screen also includes a magnifier window 550 that provides a magnified display of a selected portion of the original document. In accordance with a preferred embodiment of the present invention, the magnifier window retains browser functionality for the magnified portion.

Figure 6:
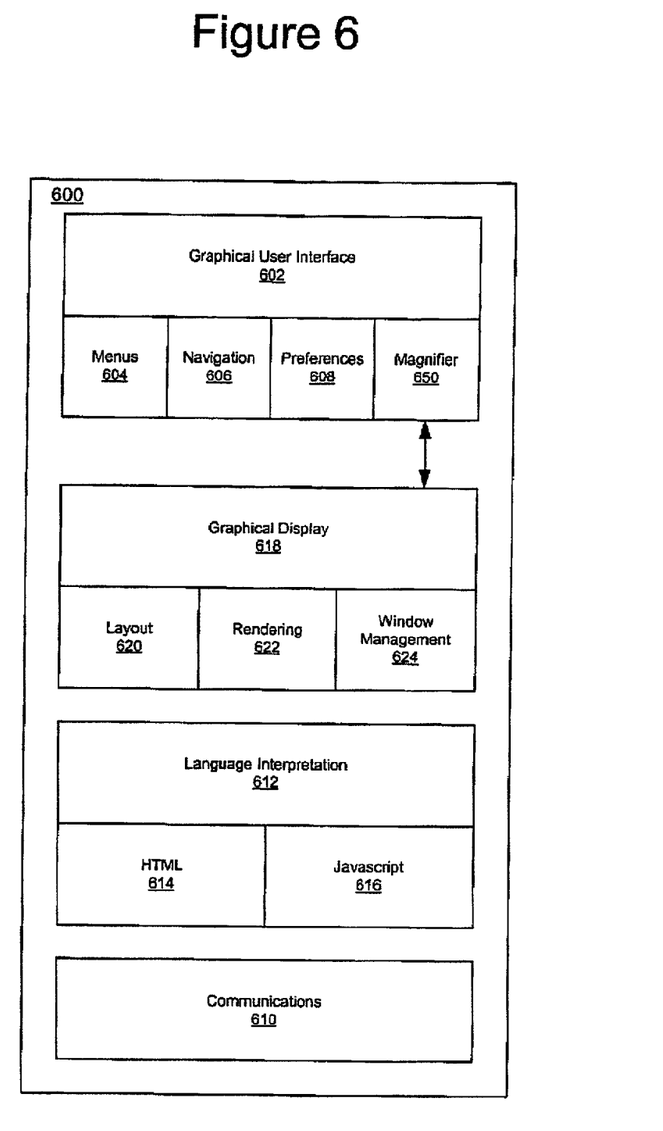
FIG. 6 is a block diagram of a browser program in accordance with a preferred embodiment of the present invention.

Turning next to FIG. 6, a block diagram of a browser program is depicted in accordance with a preferred embodiment of the present invention. A browser is an application used to navigate or view information or data in a distributed database, such as the Internet or the World Wide Web.

In this example, browser 600 includes a user interface 602, which is a graphical user interface (GUI) that allows the user to interface or communicate with browser 600. This interface provides for selection of various functions through menus 604 and allows for navigation through navigation 606. For example, menu 604 may allow a user to perform various functions, such as saving a file, opening a new window, displaying a history, and entering a URL. Navigation 606 allows for a user to navigate various pages and to select web sites for viewing. For example, navigation 606 may allow a user to see a previous page or a subsequent page relative to the present page. Preferences may be set through preferences 608.

In accordance with a preferred embodiment of the present invention, user interface 602 provides a magnified display through magnifier 650. The magnifier may be invoked through commands or menus, such as a right-click menu or menus 412 in FIG. 4. Also, toolbar 414 in FIG. 4 may include a button that may be selected to invoke the magnifier.

Communications 610 is the mechanism with which browser 600 receives documents and other resources from a network such as the Internet. Further, communications 610 is used to send or upload documents and resources onto a network. In the depicted example, communication 610 uses hypertext transfer protocol (HTTP). Other protocols may be used depending on the implementation. Documents that are received by browser 600 are processed by language interpretation 612, which includes an HTML unit 614 and a JavaScript unit 616. Language interpretation 612 will process a document for presentation on graphical display 618. In particular, HTML statements are processed by HTML unit 614 for presentation while JavaScript statements are processed by JavaScript unit 616.

Graphical display 618 includes layout unit 620, rendering unit 622, and window management 624. These units are involved in presenting web pages to a user based on results from language interpretation 612. Magnifier 650 communicates with graphical display 618 to render the magnified portion of the document in the magnified display.

Browser 600 is presented as an example of a browser program in which the present invention may be embodied. Browser 600 is not meant to imply architectural limitations to the present invention. Presently available browsers may include additional functions not shown or may omit functions shown in browser 600. A browser may be any application that is used to search for and display content on a distributed data processing system. Browser 600 make be implemented using know browser applications, such Netscape Navigator or Microsoft Internet Explorer. Netscape Navigator is available from Netscape Communications Corporation while Microsoft Internet Explorer is available from Microsoft Corporation.

Figure 7:
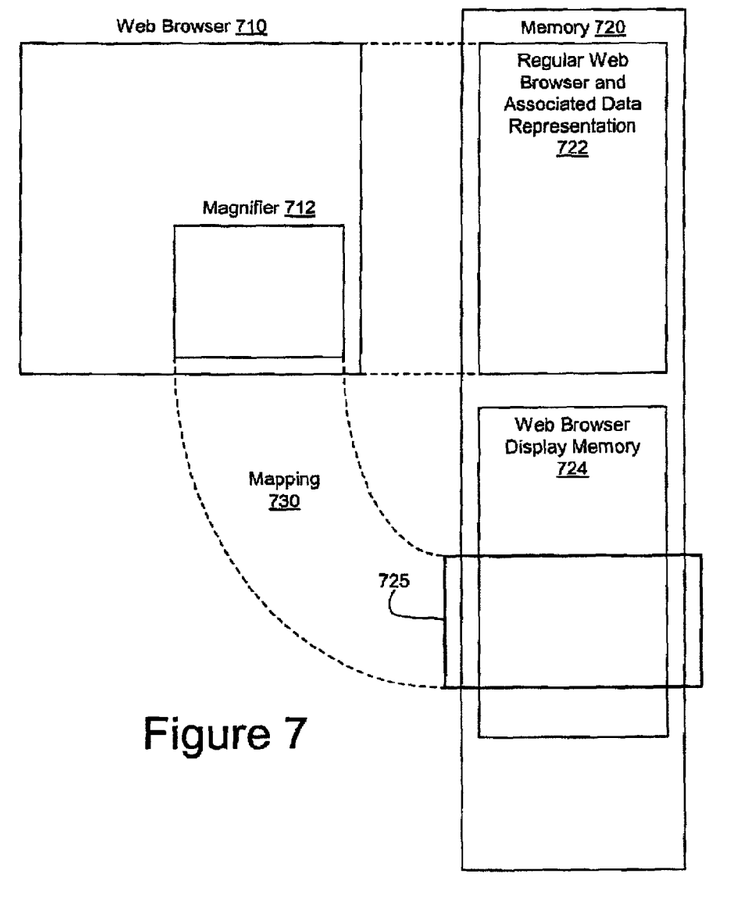
FIG. 7 is a block diagram of a memory configuration for a browser with a magnifier in accordance with a preferred embodiment of the present invention.

With reference now to FIG. 7, a block diagram of a memory configuration for a browser with a magnifier is shown in accordance with a preferred embodiment of the present invention. Web browser 710 displays a document and magnifier 712 provides a magnified display of a selected portion of the document. Memory 720 includes storage 722 for regular web browser and associated data representation and storage 724 for web browser display memory. Magnifier 712 displays a selected portion 725 from display memory 724.

Mapping 730 provides a map between the magnified display area and a corresponding display area for the original document. This magnified area may be generated as a "bit-blit"—reading a small area from the video RAM pixel-by-pixel and repopulating the adjacent cells of the expanded field using whatever magnification factor is desired. For example, the magnifier may create an expanded field with a 1:4 factor, or 1 pixel repopulated to 4 pixels, for a 2× enlargement. Thus, the existing RAM may support the rendering of the magnified display and mapping 730 maps mouse events in the magnified display to the corresponding coordinates in the "normal" display space.

Mapping 730 may also provide an imagemap between the displayed portion in the magnifier with corresponding data in the original document from data representation 722. An imagemap is a single picture image that is logically separated into areas, each of which is used to select a different option or display a different message when clicked. Imagemaps are widely used on the Web to provide a navigation bar to link to other topics or pages on a site. In accordance with a preferred embodiment of the present invention, the magnified display is mapped to the original document to form an imagemap with areas used to select options corresponding to the original document.

In an alternative embodiment of the present invention, the web browser may analyze the original web page and construct magnifier contents on the basis of either the document object model (DOM), extensible markup language (XML), or hypertext markup language (HTML) representation of the magnified portion. DOM is a common application programming interface (API) for accessing HTML and XML documents from a Web browser. DOM was developed to formalize Dynamic HTML, which allows animation, interaction and dynamic updating of Web pages. DOM provides a language and platform-neutral object model for Web pages, but because it deals with document structures in general, DOM may also be used by any application that accesses documents.

Figure 8:
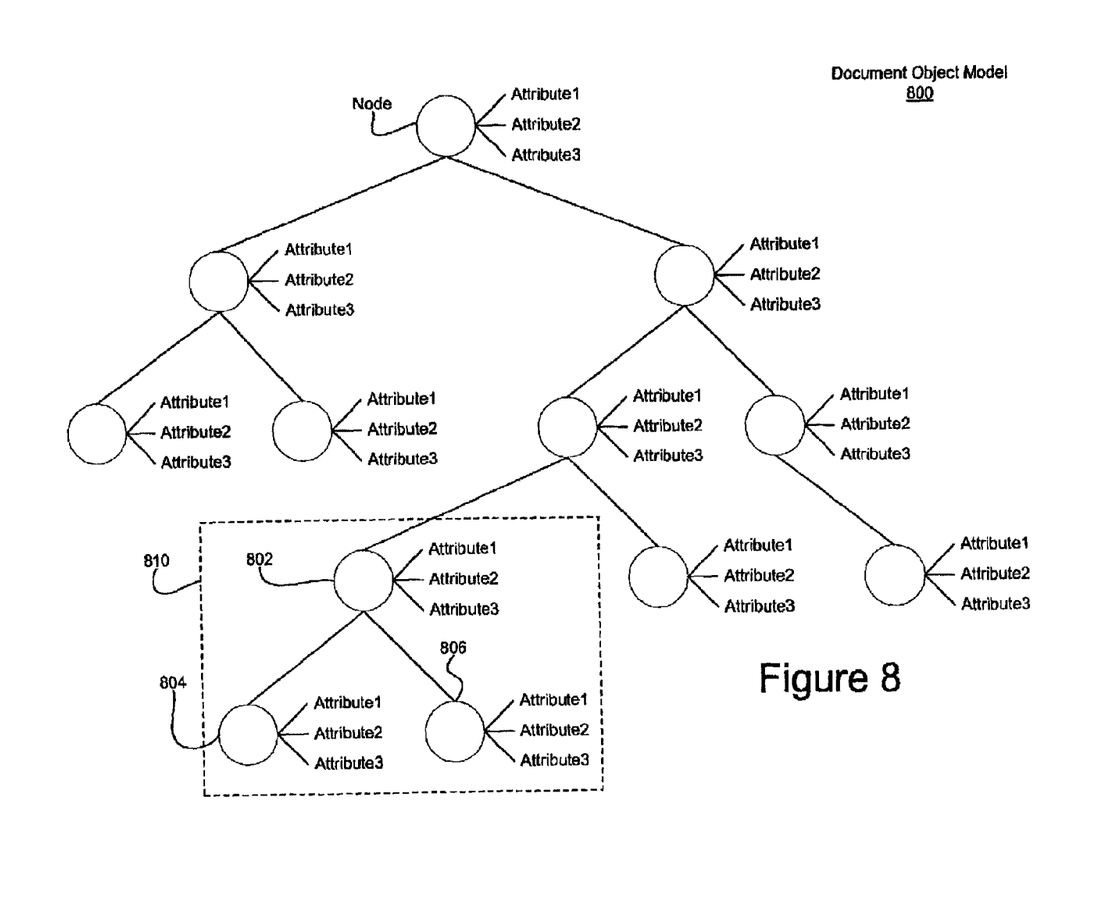
FIG. 8 is an example document object model for a document with a magnified portion in accordance with a preferred embodiment of the present invention.

With reference to FIG. 8, an example document object model for a document with a magnified portion is illustrated in accordance with a preferred embodiment of the present invention. Document object model 800 comprises a tree structure of nodes representing the document. Each node has a number of attributes. For example, a node may be "text" and the attributes may be "fontsize," "fontcolor," and "textstring."

DOM 800 includes node 802 with subnodes 804 and 806. Nodes 802, 804, 806 may represent a magnified portion 810 of a document. When a portion of the document is selected for magnified display, the magnifier may be generated based on the corresponding portion of the DOM. For example, if node 806 is a "text" node and the original attribute values are 12-point font, red, and text "News," the values may be adjusted to 24-point font, red, and text "News" for the magnified display. Thus, the magnified portion presents a portion of the tree structure and retains full browser functionality. The DOM illustrated in FIG. 8 is exemplary and the present invention may be implemented in a variety of ways, as will be readily apparent to a person of ordinary skill in the art.

Figure 9:
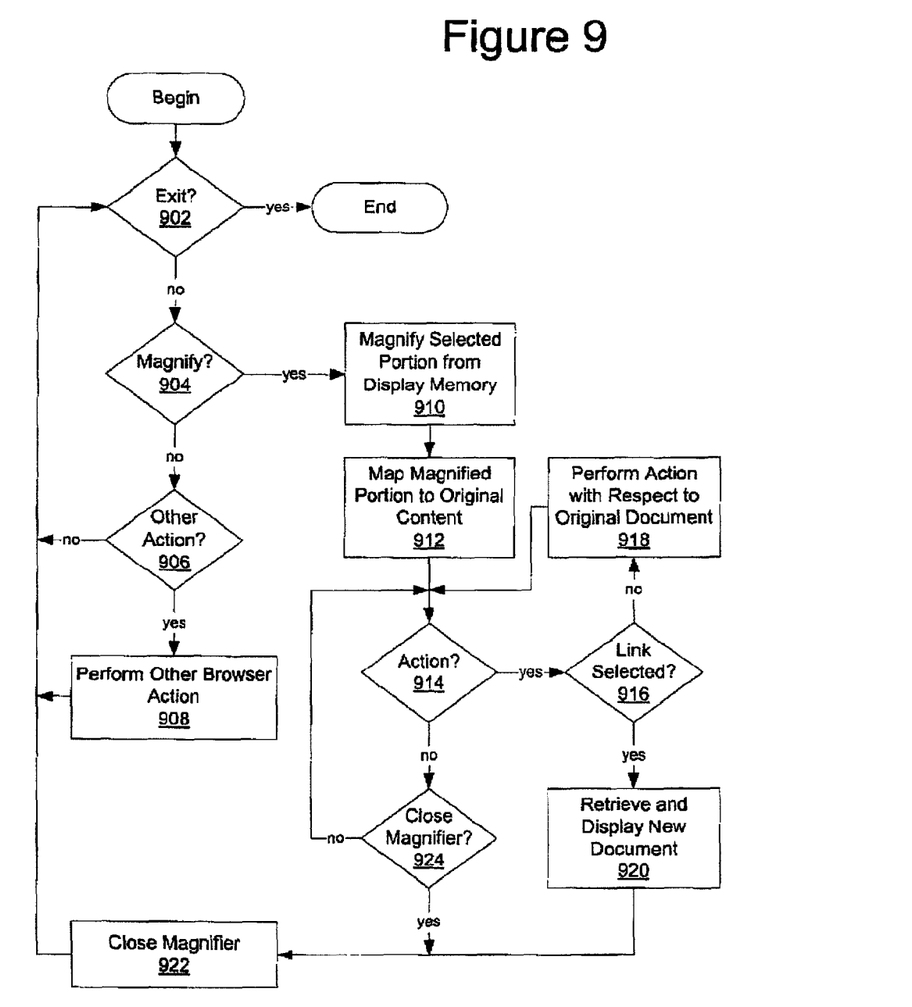
FIG. 9 is a flowchart illustrating the operation of a web browser that maps a magnified display to the original document in accordance with a preferred embodiment of the present invention.

With reference to FIG. 9, a flowchart illustrating the operation of a web browser that maps a magnified display to the original document is shown in accordance with a preferred embodiment of the present invention. The process begins and a determination is made as to whether an exit condition exists (step 902). An exit condition may exist when a user closes the browser window or exits through a menu command. If an exit condition exists, the process ends.

If an exit condition does not exist in step 902, a determination is made as to whether a portion is selected for magnification (step 904). If a portion is not selected for magnification, a determination is made as to whether another action is requested through the user interface (step 906). If another action is requested, the process performs the other browser action (step 908) and returns to step 902 to determine whether an exit condition exists. An action in step 908 may be selection of a link within the normal browser display, in which case the process retrieves and displays a new document. If another action is not requested in step 908, the process returns to step 902 to determine whether an exit condition exists.

Returning to step 904, if a portion of the document is selected for magnification, the process magnifies the selected portion from display memory (step 910) and maps the magnified portion to the original document content (step 912). Next, a determination is made as to whether an action is requested within the magnifier interface (step 914). If an action is requested within the magnifier interface, a determination is made as to whether the action is a selection of a link (step 916). If a link is not selected, the process performs the action with respect to the original document and returns to step 914 to determine whether an action is requested within the magnifier interface.

If the action is the selection of a link in step 916, the process retrieves and displays the new document (step 920), closes the magnifier display (step 922), and returns to step 902 to determine whether an exit condition exists.

Returning to step 914, if an action is not requested in the magnifier interface, a determination is made as to whether a request to close the magnifier is received (step 924). If a request to close the magnifier is received, the process closes the magnifier (step 922) and returns to step 902 to determine whether an exit condition exists. If a request to close the magnifier is not received in step 924, the process returns to step 914 to determine whether an action is requested in the magnifier interface.

Figure 10:
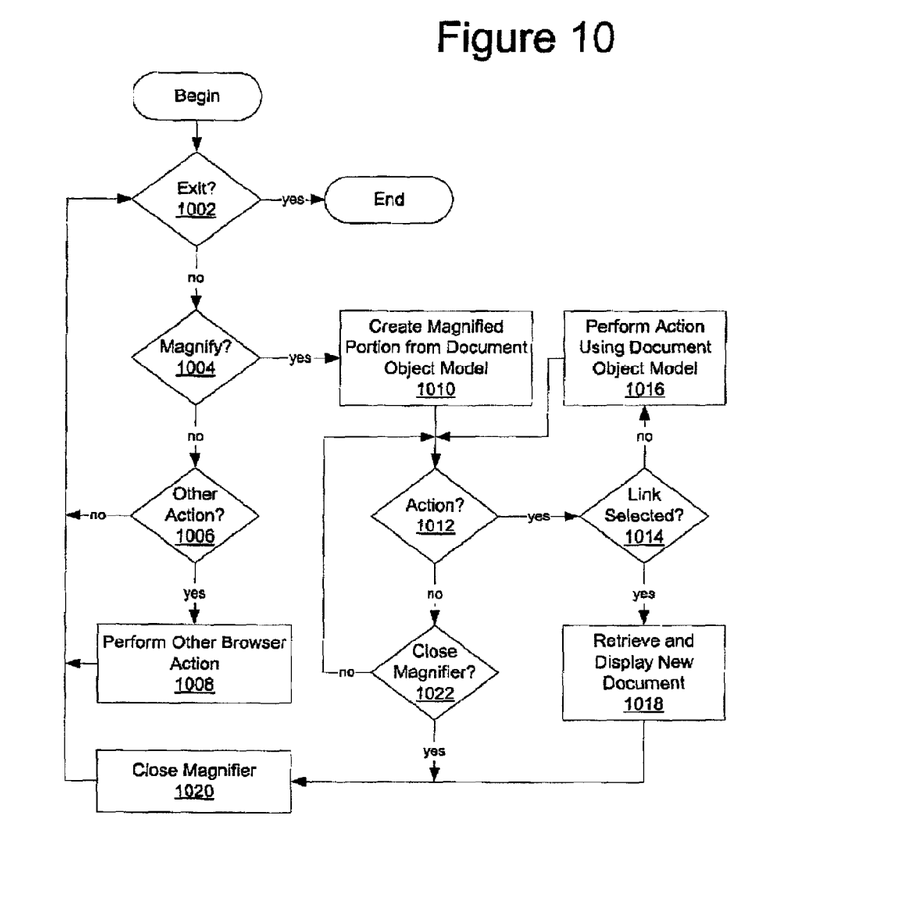
FIG. 10 is a flowchart illustrating the operation of a web browser that generates a magnified display using the document object model of the original document in accordance with a preferred embodiment of the present invention.

Turning now to FIG. 10, a flowchart illustrating the operation of a web browser that generates a magnified display using the document object model of the original document is shown in accordance with a preferred embodiment of the present invention. The process begins and a determination is made as to whether an exit condition exists (step 1002). An exit condition may exist when a user closes the browser window or exits through a menu command. If an exit condition exists, the process ends.

If an exit condition does not exist in step 1002, a determination is made as to whether a portion is selected for magnification (step 1004). If a portion is not selected for magnification, a determination is made as to whether another action is requested through the user interface (step 1006). If another action is requested, the process performs the other browser action (step 1008) and returns to step 1002 to determine whether an exit condition exists. An action in step 1008 may be selection of a link within the normal browser display, in which case the process retrieves and displays a new document. If another action is not requested in step 1008, the process returns to step 1002 to determine whether an exit condition exists.

Returning to step 1004, if a portion of the document is selected for magnification, the process creates the magnified display using the document object model of the original document (step 1010). Next, a determination is made as to whether an action is requested within the magnifier interface (step 1012). If an action is requested within the magnifier interface, a determination is made as to whether the action is a selection of a link (step 1014). If a link is not selected, the process performs the action with respect to the original document and returns to step 1012 to determine whether an action is requested within the magnifier interface.

If the action is the selection of a link in step 1014, the process retrieves and displays the new document (step 1018), closes the magnifier display (step 1020), and returns to step 1002 to determine whether an exit condition exists.

Returning to step 1012, if an action is not requested in the magnifier interface, a determination is made as to whether a request to close the magnifier is received (step 1022). If a request to close the magnifier is received, the process closes the magnifier (step 1020) and returns to step 1002 to determine whether an exit condition exists. If a request to close the magnifier is not received in step 1022, the process returns to step 1012 to determine whether an action is requested in the magnifier interface.

Thus, the present invention solves the disadvantages of the prior art by providing a web browser that magnifies the content of the whole page in memory and displays the relevant portion in a magnifier with hyperlinks. The web browser maps the magnified display to the original document. Thus, manipulation of the mouse in the magnified display may result in an action with respect to the original document. The user may also select a link for navigation within the magnified display. Alternatively, the web browser may analyze the original web page and construct magnifier contents on the basis of either the document object model, XML, or HTML representation of the magnified portion. Thus, the user need not repeatedly magnify the document and return to the original display to select links. Furthermore, changing font sizes within the entirety of the original display to enlarge text may adversely effect the layout of the page. Using the present invention, the user may select links or perform other browser functions within the magnified display.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of magnifying a portion of a document in a browser on a client, comprising:
   presenting, by a processor of a data processing system, a first document in a first display in the browser on the client;
   generating, by the processor, a magnified display of the first document in memory at the client;
   displaying, by the processor, in a second display in the browser a selected portion of the magnified display corresponding to a selected portion of the first document, wherein the second display is a magnifier window within the first display;
   mapping, by the processor, the selected portion of the magnified display in the second display to a display space of the selected portion of the first document; and
   responsive to receiving, by the processor, a selection of a link within the selected portion of the magnified display in the second display, retrieving a second document, by the processor, corresponding to the link and displaying the second document, by the processor, in the first display; and
   responsive to receiving, by the processor, a selection of a portion of text within the selected portion of the magnified display in the second display to be copied and pasted into a third document associated with a different application, copying the portion of the text selected within the selected portion of the magnified display, by the processor, and pasting the portion of the text into the third document associated with the different application, by the processor, wherein an action within the selected portion of the magnified display in the second display results in performing an action, by the processor, with respect to the original document, wherein the selected portion of the magnified display displayed, by the processor, in the magnifier window retains full browser functionality.

2. The computer implemented method of claim 1, wherein the step of mapping, by the processor, the magnified display to a display space further comprises:
   mapping the selected portion of the magnified display to the first document, by the processor, to form an imagemap.

3. The computer implemented method of claim 1, wherein the step of generating, by the processor, a magnified display of the first document comprises:
   creating the second display, by the processor, wherein the second display has a magnified display space based on a magnification factor;
   reading pixels from video memory, by the processor, for the selected portion of the magnified display in a normal display space for the first document; and
   populating pixels in the second display, by the processor, to form a magnified display.

4. The computer implemented method of claim 3, wherein the step of populating pixels in the second display, by the processor, comprises for each pixel of the normal display space, populating adjacent pixels, by the processor, based on the magnification factor.

5. The computer implemented method of claim 1, wherein the step of mapping, by the processor, the selected portion of the magnified display comprises mapping a magnified display space for the selected portion of the magnified display, by the processor, to corresponding pixels in a normal display space for the first document.

6. The computer implemented method of claim 1, wherein mapping,. by the processor, the selected portion of the magnified display in the second display to a display space of the selected portion of the first document comprises:
   mapping mouse events occurring in the second display, by the processor, to corresponding coordinates in a normal display space associated with the first document in the first display.

* * * * *